United States Patent Office 3,170,004
Patented Feb. 16, 1965

3,170,004
DYEABLE COPOLYMER OF PROPYLENE CONTAINING A SUBSTITUENT FROM THE CLASS CONSISTING OF (a) SULFONIC ACID, (b) PHOSPHONIC ACID AND (c) SULFONAMIDE
John Farago, Wilmington, Del., assignor to E. I. du Pont de Nemours and Company, Wilmington, Del., a corporation of Delaware
No Drawing. Filed Mar. 10, 1961, Ser. No. 94,692
3 Claims. (Cl. 260—874)

This invention is concerned with new and improved dyeable compositions of polypropylene.

The discovery of the linear high molecular weight polymers of alpha olefins has instigated much effort in the utilization of such polymers in fibers and films. One of the most serious defects of such polymers is their resistance to dyes of all types. It has been proposed that such polymers be colored by the incorporation of stable dyestuffs and pigments in the solutions or melts of the polymers before fabrication into shaped articles. This is an expensive procedure entailing careful process controls and the necessity of stocking large quantities of various colored yarns. At best it is a poor compromise with the use of conventional dyeing methods on dyeable products.

It has also been proposed to chemically modify the shaped articles such as fibers by a suitable after-polymerization treatment as, for example, peroxidation or irradiation and grafting with monomers that would lend dyeability to the product. This method is quite an expensive process inasmuch as it requires the handling of large amounts of shaped articles and recovering the residual monomers. It is not completely satisfactory due to the difficulty of polymerizing and controlling the desired combination of monomers to the shaped articles.

It has also been proposed to chemically alter the surface of shaped articles by after treatments such as sulfonation, chlorosulfonation, and the like. These processes have the great disadvantage of being extremely expensive and difficult to control and although they can confer dyeability to the shaped article, it is observed that the dyed articles from this process are extremely unstable to light.

It is an object of this invention to provide a polypropylene composition which can be shaped into fibers, films, and the like, which are readily dyeable using conventional techniques.

A further object is to provide dyed articles of polypropylene which are substantially wash- and light-fast.

Another object of the invention is to provide a process for the preparation of new compositions of polypropylene which are more readily blended with other polymers than the unmodified polymers.

These and other objects will become apparent in the course of the following specification and claims.

In accordance with the present invention a process is provided for forming a dyeable- fiber-forming composition of matter from the class consisting of (I) a copolymer wherein from about 99.75 to about 75% of the repeating units are propylene, the remainder repeating units comprising a random copolymer wherein from about 99 to about 50% of the repeating units are members of the class consisting of (a) styrene, (b) an aliphatic ester of acrylic acid and (c) an aliphatic ester of methacrylic acid, the remainder repeating units of the said random copolymer comprising units containing an organic radical bearing a substituent from the class consisting of (d) sulfonic acid, (e) phosphonic acid and (f) sulfonamide; and (II) a mixture of from about 99 to about 75% by weight of the entire copolymer defined in "I" above, the remainder of the mixture comprising the polymer of the random copolymeric component of the copolymer defined in "I"; and (III) a mixture of from about 99 to about 75% by weight of a member of the class consisting of the compositions defined in "I" and "II" above and "IV" below, the remainder of the mixture comprising an inert, dyeable polymer from the class consisting of (g) a polyamide, (h) a polyester, and (i) a polyurethane; and (IV) a copolymer wherein from about 99 to about 75% of the repeating units are propylene, the remainder repeating units being a member of the class consisting of (a), (b) and (c), the said process comprising subjecting to high shear at a temperature of from about 120° C. to about 240° C. for a period of from about 1 to about 20 minutes; (A) a mixture of from about 99.75 to about 75% polypropylene, the remainder of the said mixture being a random copolymer wherein from about 99 to about 50% of the repeating units are members of the class consisting of (a), (b) and (c) above, the remainder repeating units of the said random copolymer comprising units containing an organic radical bearing a substituent from the class consisting of (d), (e) and (f) above, to form the product of "I" above; (B) a mixture of from about 99 to about 75% by weight of the copolymer of "I" above, the remainder of the said mixture being the polymer of the random copolymeric component of the copolymer of "I" above to form the product of "II" above; and (C) a mixture of from about 99 to about 75% by weight of a member of the class consisting of "I," "II" and "IV" above, the remainder of the said mixture being a member from the class consisting of (g), (h) and (i) above, to form the product of "III" above; and (D) a mixture of from about 99 to about 75% of polypropylene, the remainder of the said mixture being a polymer of the class of (a), (b) and (c) to form the product of "IV" above.

By the expression "high shear" is meant that shear obtained by the use of conventional milling rolls, Banbury mixers, screw extruders, and the like. Preferably the polymers are mixed on a rubber mill comprising a pair of stainless steel rolls 6 inches in diameter by 12 inches long with about a $\frac{1}{16}$ inch clearance between the rolls. The slower roll is operated at about 20 revolutions per minute and the faster roll may be operated at 1.1 to 1.4 times the speed of the slower roll.

The shear rates obtained at these extremes appear below:

Ratio of roll speeds— Shear rate sec.$^{-1}$
1.1:1 _____ 9.6
1.4:1 _____ 40

The viscosities of the polymer are quite high as shown by the following ranges:

| Temperature, degrees | 0.7 Melt Index Poises × 10$^{-5}$ | 7.0 Melt Index Poises × 10$^{-4}$ |
|---|---|---|
| 100 | 11.2 | 11.2 |
| 130 | 5.6 | 5.6 |
| 160 | 2.8 | 2.8 |
| 190 | 1.43 | 1.4 |
| 220 | 0.71 | 0.7 |
| 250 | | 0.35 |

It should be noted that a slurry of the polypropylene in a monomer at room temperature would have a viscosity of about 1 poise.

It is postulated that controlling the actual process is the amount of work done on the polymer as expressed in the following equation:

Power required = viscosity (shear rate)$^2$ (volume of polymer under shear)

Since estimating the volume of material being subjected to these working conditions is quite difficult, one alternate is to calculate the power required per cm.$^3$ being worked and assume that one skilled in the art would know the approximate volume under shear. From this basis the following minimum and maximum power requirements can be calculated based on the maximum polymer viscosity and the minimum shear rates in the process.

Power maximum (ergs/second) per cm.$^3$ of polymer=1.1×10$^6$ poises (dyne-sec. cm.$^{-2}$) (40 sec.$^{-1}$)$^2$cm.$^3$=1.8×10$^9$ dyne cm. sec.$^{-1}$=1.8×10$^9$ ergs/sec.

Power minimum per cm.$^3$ of polymer=3.6×10$^3$ poises (9.6 sec.$^{-1}$)$^2$=3.3×10$^6$ ergs/sec.

Thus the power requirements of the process may be desecribed as lying between 3×10$^6$ and 2×10$^9$ ergs/sec. The effect of this would depend upon the time of treatment. Since in the rubber mill having a circumference of about 48 cm. only about ½ cm. length of the material on a roll is under this shear, it is evident that each volume element of the total mix is being worked for .5/48 part of the time described (1 to 20 minutes). Thus a given volume of the polymer is subjected to the above power input for a period of .01 to .20 of a minute.

In the examples which follow the expression "inherent viscosity" is defined as:

$$\frac{\ln(n)_r}{c}$$

wherein $c$ is the concentration in grams (0.10) of the polymer in 100 ml. of the solvent, $(n)_r$ is the relative viscosity which is the ratio of the flow times in a viscosimeter of polymer solution and of the solvent, both at the same stated temperature. Dyebaths employed each contain 0.1 gram of dye, 2 ml. of 2.5% by weight of lauryl sulfate in water, and 50 ml. of water. When dispersed dyes are employed .30 gram of glacial acetic acid is added to the three listed items, while the vat dye baths contain 0.3 gram of sodium hydrosulfite and 2 ml. of 20% aqueous sodium hydroxide in addition to the three listed items. Unless otherwise noted, the polypropylene used in each example is an isotactic polypropylene of melt index 0.7 ("Profax" extrusion grade resin) having an inherent viscosity of 2.75 tetrahydronaphthalene at 130° C. The rubber mill employed in each example consists of a pair of stainless steel rolls 6 inches in diameter by 12 inches long internally heated by circulating hot oil and having a variable displacement between the rolls. In each example a clearance of one sixteenth inch is used. Except in Example 9, each mixture is milled for a period of about 5 minutes at a surface temperature of 220° C. on the rolls producing a clear homogeneous mass. The materials of Example 9 are mixed for 10 minutes at 200° C. As stabilizer in Examples 2–4 and 6–9, a minor amount (0.1% to about 0.5% by weight) of 4,4'-butylidene bis(6-tertiary butyl m-cresol) is added by milling it in for an additional 1 to 2 minutes after homogeneity of the milled mass is attained.

EXAMPLE 1

*Milled composition*

900 grams polypropylene.
100 grams polymethylmethacrylate (commercial molding grade).

A film pressed from this polymer loses only 2.4% of its weight after 1 hour's extraction in boiling acetone indicating that the final composition contains about 7.6% of polymethyl methacrylate chemically combined with the polypropylene.

EXAMPLE 2

*Milled composition*

458 grams polypropylene.
15 grams of a random copolymer made from methyl acrylate and sodium allyl sulfonate by polymerization in a solution of dimethyl sulfoxide at 80° C. with an azo-type initiator. The polymer is recovered by precipitation in dilute hydrochloric acid, rinsed with water and alcohol, and dried. The solid copolymer has a sulfur analysis corresponding to 7% content of the allyl sulfonic acid in the copolymer. It is completely soluble in cold acetone.

The milled polymeric composition is cooled and cut on an Abbey cutter to ⅛" size particles. The polymer melt at 280° C. is extruded through a spinneret at 270° C. (34 holes of 0.012 inch diameter) and the yarn wound up at 184 yards per minute (y.p.m.). The yarn is drawn 2× (i.e. drawn length/as-spun length) over a 115° C. metal pin to provide strong fibers with physical properties equivalent to fibers obtained in a similar manner from polypropylene alone.

The yarns are dyed to a dark shade by 30 minutes at the boil in an aqueous bath containing 0.05% of the dye C.I. Basic Green 1 (0.5% soluble in acetone) and 0.05% of acetic acid. Submission of the dyed fibers to boiling acetone does not extract the color. Fibers prepared in a similar manner from polypropylene alone are barely stained by this dye bath and the stain is removed by boiling acetone.

Similar results are obtained when the rubber mill is replaced by a screw extruder containing a mixing screw heated to 200° C. with the speed adjusted to afford a 5-minute residence time. The product can be extruded into shaped articles directly from the extruder.

EXAMPLE 3

*Milled composition*

459 grams polypropylene.
15 grams of a random copolymer prepared from methyl acrylate and sodium styrene sulfonate by polymerization in dimethyl sulfoxide at 80° C. The polymer is recovered by precipitation in dilute hydrochloric acid, washed, and dried. The copolymer contains 6% styrene sulfonic acid by analysis, and is soluble in acetone.

After milling the blend is permitted to cool and is then cut on an Abbey cutter to ½" size particles. The powdered polymer is fed to a screw melter and extruded as a melt at 260° C. through a spinneret (250° C.) containing five holes of 0.025 inch in diameter and the yarn wound up at 400 yards per minute (y.p.m.).

The yarn dyes to a dark shade using the dyeing conditions of Example 2 which color is not extracted by boiling acetone. A control yarn of polypropylene is stained to a very light stain under the sample dyeing conditions.

EXAMPLE 4

*Milled composition*

457 grams polypropylene.
25 grams anhydrous and particulate colloidal silica (Cab-o-Sil M-5).
15 grams of a random copolymer containing 90% methyl acrylate, and 10% allyl sulfonic acid made as described in Example 3.

The milled composition is extruded into fibers as in Example 3. The as-spun yarn is drawn 2× over a 100° C. pin and then an additional 1.6× over a 130° C. pin. The yarn has a tenacity of 2.6 g.p.d., an elongation at the break of 255%, and an initial modulus of 11 grams per denier. It dyes to a deep uniform shade (that is washfast) in the dye bath of Example 2. The yarn is also dyed to medium shades with the vat dyes C.I. solubilized Vat Yellow 4 (C.I. 59101) and C.I. Vat Red 1 (C.I. 73.360). These vat dyes do not even stain fibers of polypropylene.

The presence of the colloidal silica aids the dyeing of the fibers but has little effect by itself. Yarns prepared from milled compositions as the above with the omission of the acid-copolymer only dye to a light shade in the dye bath of Example 2. The yarns thus dyed are substantially inferior in washfastness to the yarns of this invention.

EXAMPLE 5

Milled composition 30 grams polypropylene.

5 grams of sulfonated polystyrene (wherein about 10 to about 40% of the styrene units are sulfonated) formed by heating, between 70 and 75° C., with stirring, for about 2 hours a mixture of 20 grams of polystyrene (mol. wt. 127,700) and 200 grams of concentrated sulfuric acid. The reaction mixture is poured into water and the precipitated polymer washed with water, then methanol, and air dried.

A portion of the above sufonated polystyrene (5 grams) is mixed with 30 grams of the polypropylene of Example 1 and rubber milled at 220° C. for about 5 minutes. The composition turns black but a fair quality film is pressed from it which dyes to a deep shade with the dye C.I. Basic Green Dye 1.

EXAMPLE 6

Composition milled 444 grams polypropylene (a mixture of 301 grams of the polypropylene of Example 1) and 143 grams of polypropylene of melt index 12.3, made by thermal degradation of higher molecular weight polypropylene.

21 grams colloidal silica.

21 grams of a poly(styrene/styrene sulfonamide) random copolymer prepared as follows: 50 grams of the polystyrene of Example 5 and 500 ml. of methylene chloride are mixed in a 2,000 ml. glass beaker and cooled to 5° C. A solution of 2 ml. of chlorosulfonic acid in 250 ml. of methylene chloride cooled to 5° C. is added to the polystyrene slurry and then stirred over a 15-minute period. 100 ml. of concentrated ammonium hydroxide is then added to the clear mixture and methylene chloride evaporated on a steam bath while adding water and methanol. The precipitate is washed with water and alcohol in turn and then dried. The product (46.5 grams) has a melting point of 220° C. and has a sulfur content of 1.5, 1.4%. Based on this analysis, the product contains 8.3% of styrene sulfonamide units.

The uniform-appearing, milled polymeric mixture is chilled, ground into small particles, and spun into fibers as in Example 2 and drawn 3× on a 100° C. pin. The fibers have a tenacity of 2.48 grams per denier, an elongation at the break of 136%, and an initial modulus of 31 grams per denier.

The fibers dye to a good dark shade with the dye 4-phenyl azo-1 (p-hydroxyphenyl azo)-3-methyl-6-methoxy benzene as disclosed in United States Patent 2,072,252. The dyed samples have good light durability as evidenced by the first serious change of color ("color break") occurring after 88 hours in a Fade-o-meter (model Atlas type FDA-R). This was suprising in view of the fact that fibers prepared from polypropylene and then chlorosulfonated by chlorine, and sulfur dioxide in the presence of ultraviolet light show an affinity for basic and dispersed dyes but such dyed fibers show an extremely poor light-fastness (2 to 8 hours to a color break in the Fade-o-meter). This shows the necessity for having the dyeable sites located on a polymer chain other than the base material. This is accomplished in this invention by using preformed copolymers to react with polypropylene.

EXAMPLE 7

Composition milled 500 grams of polypropylene.
25 grams colloidal silica.
50 grams poly(styrene/styrene sulfonate) of Ex. 6.

Fibers of this composition are formed as described in Example 6. They are observed to dye to good dark shades with Astrazone Red 6B and the disperse dye of Example 6.

EXAMPLE 8

Composition milled (in 500 gram batches)

2506 grams polypropylene.

284 grams of a poly(methyl acrylate/styrene/styrene sulfonamide) random copolymer prepared as follows: Equal weights of styrene and methyl acrylate are polymerized in a solution of methyl ethyl ketone at 80–90° C. in the presence of an azo initiator. The washed and dried copolymer containing equal parts of styrene and methyl acrylate (255 grams) is slurried with 1500 grams of methylene chloride, and the slurry cooled in an ice bath to 0° C. A solution of 36 ml. of chlorosulfonic acid in 500 ml. of methylene chloride is cooled in an ice bath to 0° C. and slowly added to the above polymeric slurry while it is being stirred with a magnetic stirrer. After 15 minutes the stirrer is replaced with an air-driven propeller and 200 ml. of concentrated ammonium hydroxide added. The methylene chloride is removed by heating on a steam bath while adding alcohol to the mixture. The precipitated polymer is washed with water in a Waring Blendor, decanted, rinsed with alcohol, and air dried. Analysis shows sulfur 1.36, 1.38%, corresponding to 7.9% styrene sulfonamide units in the copolymer.

The milled product is cooled pulverized, and spun as a melt as in Example 2. The yarn is drawn a total of 3× through hot water (2×) and then over a 130° C. pin for another 1.5× to give a good quality yarn with a tenacity of 1.7 grams per denier, an elongation of 463%, and an initial modulus of 14.1 grams per denier. The yarns dye to dark uniform shades with basic dyes such as Astrazone Red 6B—"Synthetic Dyes" by Venkataraman and Fieser, vol. II, page 1174, Academic Press, Inc., New York, 1952 (C.I. Basic Red 13—C.I. 48015) and with dispersed dyes such as C.I. 60755, C.I. disperse Red 4 and the dispersed dye of Example VI. The yarn is dyed to a medium shade with the vat dye C.I. Vat Blue 5—C.I. 73065.

These fibers are preferred to those of Example 6 because they dye to deeper shades with dispersed and basic dyes and are also dyeable by vat dyes.

EXAMPLE 9

Composition milled 100 grams polypropylene.
5 grams polymethyl methacrylate.

15 grams of a random copolyamide of poly(hexamethylene adipamide / hexamethylene sebacamide(caproamide), the components being present in the ratio of 35/27/38 and the copolymer having a melting point of 148–160° C. A good uniform product (106 grams) containing 93% of the original polyamide is recovered. Yarns spun from the product dye to deep shades with acid dyes.

When the polymethyl methacrylate is omitted from the above mixture, the polyamide sticks to the rolls and only about 75% of it can be incorporated into the blend.

The compositions of this invention are postulated to be block copolymers. If polypropylene is represented by P–P–P–P and a random copolymer (from monomers $a$ and $b$) by $a$–$b$–$a$–$a$, block copolymers may be represented by

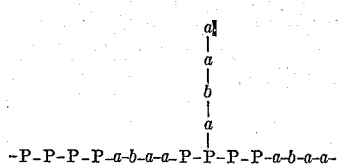

Block copolymers are to be distinguished from graft copolymers which are conventionally represented by

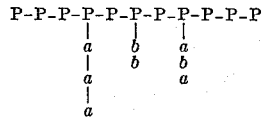

if monomer $b$ is reactive enough to graft.

Depending on the reactivity of the polymers and reaction conditions, the product of this invention will contain from 0 to 75% of unreacted polymer. This can be extracted if desired. Preferably the reacting polymers or copolymers are sufficiently compatible that the presence of unmodified polymer does not seriously affect the final product.

Polypropylenes suitable for use in this invention are highly crystalline as shown by sharp and distinct X-ray diffraction patterns. The polymer may be predominantly isotactic in character or block copolymers of the isotactic and non-isotactic forms may be used. The polypropylene may be of any high molecular weight polymer.

For some reasons, such as blending with other polymers, a homopolymer of the monomer may be used but where it is desired to confer conventional dyeability without the addition of other polymers, the copolymer will contain from 1 to 25% of a modifying monomer or monomers which are readily dyeable. Other monomer units may be present in the polymer to an extent of less than about 50% for altering the physical properties such as melting point, etc.

The dyeable copolymers may be made by chemical modification of a polymer or copolymer as, for example, sulfonation or sulfoamidation or the like, or the copolymer can be made by copolymerization of the desired monomers using conventional techniques. Dyeability with basic dyes can be conferred by the use of monomers containing acid groups as carboxylic, sulfonic, or phosphonic. In general, the use of the stronger acid groups as sulfonic or phosphonic as, for example, 1-propene-2-phosphonic (U.S. Patent 2,439,214) or phenylethene-2-phosphonic acids are preferred to the use of carboxylic acids.

Monomers containing sulfonic acid groups (as salts or free acids) are especially preferred such as styrene sulfonic acid, methylallyl sulfonic acid, allyl sulfonic acid, ethylene sulfonic acid, and other ethylenically unsaturated sulfonic acids as disclosed in U.S. Patents 2,527,300 and 2,601,256.

The presence of sulfonamide groups in the modifying polymer are particularly valuable. These are readily obtained by the sulfoamidation of polymers containing benzene rings such as styrene, vinyl benzoate, and the like.

The sulfonamide groups can also be obtained from aliphatic sulfonyl groups present in the monomer or polymer.

Dyeability with acid dyes has been obtained by using copolymers containing basic monomers as N,N'-diethylaminoethyl methacrylate, and the like, but these are much less preferred than the copolymers previously mentioned.

The preparation of such copolymers and/or chemically modified polymers will be apparent to one skilled in the art.

The polymers used for this interaction with alpha olefin polymers must be thermoplastic at the temperatures used in the process.

The necessary shear may be obtained by the use of conventional milling rolls, Banbury mixers, screw extruders, etc.

Although it may be desirable for some low molecular weight polypropylene polymers to exclude excess oxygen, surprisingly it has been found that with the polymers illustrated herein that the process works well in the presence of atmospheric oxygen.

The compositions of this invention show an improved compatibility with inert dyeable polymers over the unmodified polypropylene. Although the interpolymer or block copolymer of polypropylene and the monomers listed above can be made and then physically blended with the inert dyeable polymer, it is preferred that the interpolymerization and blending take place simultaneously. Suitable inert (i.e. they do not interpolymerize) dyeable polymers may be found in all classes of condensation polymers such as polyamides, polyesters, polyurethanes, polyureas, etc. They should be thermoplastic under the shear and temperatures of this process. Copolyamides such as poly(hexamethylene-adipamide/sebacamide-caproamide) are especially preferred.

A stabilizer may be added to the composition of this invention to prevent undue degradation of the polypropylene.

Inorganic modifiers may be added to polymeric components either before or after the interpolymerizing process. Such products as colloidal silica or alumina in amounts of 3 to 20% based on total weight tend to improve the dyeability of shaped articles made from the compositions.

Many equivalent modifications of the above will be apparent to those skilled in the art without a departure from the inventive concept.

What is claimed is:

1. A dyeable, fiber-forming composition of matter from the class consisting of (I) a copolymer wherein from about 99.75 to about 75% of the repeating units are propylene, the remainder repeating units comprising a random copolymer wherein from about 99 to about 50% of the repeating units are members selected from the class consisting of (a) styrene, (b) an aliphatic ester of acrylic acid (c) an aliphatic ester of methacrylic acid; the remainder repeating units of the said random copolymer comprising units containing an organic radical bearing a substituent selected from the class consisting of (d) sulfonic acid, (e) phosphonic acid and (f) sulfonamide; and (II) a mixture of from about 99 to about 75% by weight of the entire copolymer defined in "I" above, the remainder of the mixture comprising the polymer of the random copolymeric component of the block copolymer defined in "I"; and (III) a mixture of from about 99 to about 75% by weight of at least one component selected from a member of the class consisting of (1) the compositions defined in "I" above, (2) the composition defined in "II" above and (3) a copolymer wherein from about 99 to about 75% of the repeating units are propylene, the remainder repeating units being a member selected from the class consisting of (a), (b) and (c) above, the remainder of the mixture comprising an inert, dyeable linear polyamide wherein the amide linkage is an integral part of the polymer chain.

2. A fiber of the composition of claim 1.

3. A film of the composition of claim 1.

References Cited in the file of this patent
UNITED STATES PATENTS 2,994,679     Jones et al. _____ Aug. 1, 1961

FOREIGN PATENTS 1,209,070     France _____ Sept. 21, 1959